(12) United States Patent
Guo et al.

(10) Patent No.: US 11,834,605 B2
(45) Date of Patent: Dec. 5, 2023

(54) GEOPOLYMER CEMENTING FLUID WITH CONTROLLABLE THICKENING TIME

(71) Applicant: CHINA UNIVERSITY OF PETROLEUM (EAST CHINA), Qingdao (CN)

(72) Inventors: Shenglai Guo, Qingdao (CN); Kunpeng Li, Qingdao (CN); Yang Li, Qingdao (CN); Ming Li, Qingdao (CN); Jiaxin Zhao, Qingdao (CN); Yuhuan Bu, Qingdao (CN); Huajie Liu, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 17/982,571

(22) Filed: Nov. 8, 2022

(65) Prior Publication Data
US 2023/0235210 A1    Jul. 27, 2023

(30) Foreign Application Priority Data

Jan. 25, 2022  (CN) .......................... 202210082975.8

(51) Int. Cl.
| | | |
|---|---|---|
| *C09K 8/467* | (2006.01) | |
| *C04B 7/26* | (2006.01) | |
| *C04B 12/00* | (2006.01) | |
| *C04B 22/06* | (2006.01) | |
| *C04B 22/14* | (2006.01) | |

(Continued)

(52) U.S. Cl.
CPC ................ *C09K 8/467* (2013.01); *C04B 7/26* (2013.01); *C04B 12/005* (2013.01); *C04B 22/064* (2013.01); *C04B 22/142* (2013.01); *C04B 24/04* (2013.01); *C04B 24/121* (2013.01);
(Continued)

(58) Field of Classification Search
CPC ......... C09K 8/467; C04B 7/26; C04B 12/005; C04B 22/064; C04B 22/142; C04B 24/04; C04B 24/121; C04B 28/021; C04B 2103/10; C04B 2103/20
See application file for complete search history.

(56) References Cited

U.S. PATENT DOCUMENTS

| | | | |
|---|---|---|---|
| 5,423,379 A | 6/1995 | Hale et al. | |
| 2011/0284223 A1* | 11/2011 | Porcherie ............... | C09K 8/467 166/292 |
| 2021/0253933 A1* | 8/2021 | Pisklak ................. | C04B 28/006 |

FOREIGN PATENT DOCUMENTS

| | | |
|---|---|---|
| CN | 109437710 A | 3/2019 |
| CN | 110790553 A | 2/2020 |

(Continued)

*Primary Examiner* — Crystal J. Lee
(74) *Attorney, Agent, or Firm* — Bayramoglu Law Offices LLC

(57) ABSTRACT

A geopolymer cementing fluid with controllable thickening time includes the following components in parts by weight: 100 parts of a cementitious material, 10 parts-30 parts of an activator, 0.2 parts-5 parts of a retarder, 0.4 parts-4 parts of an anti-settling agent, and 30 parts-70 parts of water. The geopolymer cementing fluid of the present invention has the advantages of controllable thickening time, excellent compressive strength, good settlement stability, good rheological properties, green and eco-friendly, and the like. The geopolymer cementing fluid can be better suited for the operations of oil and gas well cementing and ensure cementing safety.

3 Claims, 2 Drawing Sheets

(51) Int. Cl.
*C04B 24/04* (2006.01)
*C04B 24/12* (2006.01)
*C04B 28/02* (2006.01)
*C04B 103/10* (2006.01)
*C04B 103/20* (2006.01)

(52) U.S. Cl.
CPC ........ *C04B 28/021* (2013.01); *C04B 2103/10* (2013.01); *C04B 2103/20* (2013.01)

(56) References Cited

FOREIGN PATENT DOCUMENTS

| | | |
|---|---|---|
| WO | 2016146251 A1 | 9/2016 |
| WO | 2020117185 A1 | 6/2020 |

* cited by examiner

GEOPOLYMER CEMENTING FLUID WITH CONTROLLABLE THICKENING TIME

CROSS REFERENCE TO THE REPLATED APPLICATIONS

This application is based upon and claims priority to Chinese Patent Application No: 202210082975.8, filed on Jan. 25, 2022, the entire contents of which are incorporated herein by reference,

TECHNICAL FIELD

The present invention relates to the technical field of well cementing, in particular to a geopolymer cementing fluid with controllable thickening time.

BACKGROUND

In recent years, carbon emission reduction has become increasingly urgent nationwide, and various industries have reduced carbon emissions. Traditional oil well cement is silicate cement, and the production of one ton of silicate cement releases about one ton of carbon dioxide. Geopolymer cementitious material is mainly prepared by solid wastes, such as fly ash and slag, under the excitation of an alkali activator, which belongs to waste utilization. The replacement of silicate cement with geopolymer cementitious material can significantly reduce carbon dioxide emissions. However, studies have shown that the thickening time of geopolymer cementing fluid is difficult to control. Traditional geopolymer cementitious material prepared from fly ash and metakaolin, etc. in the presence of an activator of sodium hydroxide and sodium silicate, etc., has high strength (up to more than 40 MPa). However, fly ash, metakaolin, and the like are dissolved and polymerized rapidly under the action of alkali activators, such as sodium hydroxide and sodium silicate, which cannot be regulated even by using retarders, resulting in uncontrollable thickening and setting time of the geopolymer. In the previous study, an alkali-activated slag cementing fluid with adjustable thickening time was prepared by activating slag based on the reaction of sodium carbonate and calcium hydroxide instead of using calcium hydroxide (patent application number: CN201911098688.0). However, due to the high alkalinity of sodium carbonate and the difficulty of using retarders to control the dissolution process, the adjustment of thickening time is available only below 120° C. Furthermore, the geopolymer prepared with sodium hydroxide or its substitution has some shortcomings, such as low strength and high fissility, which also limits the application of geopolymer cementing fluid in oil and gas well cementing. Therefore, to promote the popularization and application of geopolymer in well cementing, it is urgent to develop a geopolymer cementing fluid with controllable thickening performance, excellent strength performance, and low fissility.

SUMMARY

The purpose of the present invention is to provide a geopolymer cementing fluid with controllable thickening time and to solve the problem that the thickening time of existing geopolymer can be regulated only within a limited temperature range and has low strength.

To achieve the above purpose, the present invention provides a geopolymer cementing fluid with controllable thickening time, including the following components in parts by weight:
a cementitious material: 100 parts,
an activator: 10 parts-30 parts,
a retarder: 0.2 parts-5 parts,
an anti-settling agent: 0.4 parts-4 parts, and
water: 30 parts-70 parts.

According to the present invention, preferably, the cementitious material is a mixture of fly ash, ultra-fine fly ash, and slag. A weight ratio of the fly ash, the ultra-fine fly ash, and the slag is (20-60):(20-60):(10-30), and the resultant formula has good strength and reasonable cost.

According to the present invention, preferably, the fly ash has a silica dioxide content greater than 40% and a specific surface area greater than 400 $m^2$/kg.

According to the present invention, preferably, the ultra-fine fly ash has a silica dioxide content greater than 40% and a specific surface area greater than 1500 $m^2$/kg.

According to the present invention, preferably, the slag is granulated blast furnace slag with a specific surface area greater than or equal to 400 $m^2$/kg.

According to the present invention, preferably, the activator is a mixture of sodium sulfate, calcium hydroxide, and barium hydroxide. A weight ratio of the sodium sulfate, the calcium hydroxide, and the barium hydroxide is (40-80):(5-40):(5-60).

According to the present invention, preferably, the retarder is a mixture of sodium tartrate and ethylenediamine tetra(methylene phosphonic acid) sodium. A weight ratio of the sodium tartrate and the ethylenediamine tetra(methylene phosphonic acid) sodium is (0-100):(0-100). The mixture improves the high-temperature resistance and right-angle thickening properties.

The activator for traditional geopolymer is sodium hydroxide, but its hydration mechanism is different from that of traditional silicate cement. The latent active cementitious materials, such as fly ash and slag, are dissolved rapidly in the highly alkaline environment of sodium hydroxide, which can hardly be regulated by retarders, so it is difficult to control the thickening time of geopolymer by retarders. In this regard, the present invention uses a retarder to control the rate of sodium sulfate reacting with calcium hydroxide to produce sodium hydroxide, thereby realizing the effective regulation of the thickening time of the geopolymer.

In the present invention, the reaction of sodium sulfate and calcium hydroxide will produce a large amount of calcium sulfate in the geopolymer, and the calcium sulfate will reduce the hydration rate of aluminate in the geopolymer, which in turn affects the original strength of the geopolymer. The reaction of sodium sulfate and barium hydroxide will produce sodium hydroxide and barium sulfate similar to the reaction of sodium sulfate and calcium hydroxide. However, because the solubility of barium hydroxide is higher than that of calcium hydroxide, the process of sodium sulfate reacting with barium hydroxide is less easily regulated by retarders than the process of sodium sulfate reacting with calcium hydroxide. Therefore, only sodium sulfate and barium hydroxide are insufficient. However, the reaction product barium sulfate does not affect the hydration rate of aluminate, which can ensure the original strength of the geopolymer. Therefore, the activator is determined as a mixture of sodium sulfate, calcium hydroxide, and barium hydroxide.

According to the present invention, preferably, the anti-settling agent is a mixture of diutan gum, diatomite, and fumed silica. The weight ratio of the diutan gum, the diatomite, and the fumed silica is (0.1-1):(30-40):(30-40). The diutan gum, the diatomite, and the fumed silica are all suspending agents with excellent thixotropic effects. The diutan gum has a good suspension effect at medium or low temperatures, which deteriorates as the temperature increases and the polymer viscosity decreases. The diatomite and fumed silica belong to inorganic materials, and with the increase in temperature, the hydration effect is more thorough while the suspension effect is almost not affected or slightly enhanced. Hence, the combined use of diutan gum, diatomite, and fumed silica will result in a better suspending and settling effect.

According to the present invention, preferably, the water is freshwater, seawater, or water of different salinities.

Compared with the prior art, the present invention has the advantages as follows:

1. The geopolymer cementing fluid with controllable thickening time provided by the present invention can be well regulated in terms of thickening time. The thickening time of the geopolymer is controlled mainly by using retarders to control the rate of sodium sulfate reacting with calcium hydroxide (barium hydroxide) to produce the activator sodium hydroxide, and the thickening time can be regulated at a temperature higher than 150° C.

2. The geopolymer cementing fluid with controllable thickening time provided by the present invention has excellent compressive strength, and the compressive strength can be higher than 30 MPa. To improve the compressive strength, the present invention introduces spherical ultra-fine fly ash with high activity into the raw materials of the geopolymer to improve the geopolymer's strength and uses barium hydroxide to replace part of the calcium hydroxide to increase the geopolymer's strength.

3. Due to the introduction of a suspending agent, the geopolymer cementing fluid with controllable thickening time provided by the present invention has excellent settlement stability, and the density difference of set cement can be lower than 0.01 g/cm$^3$.

4. The present invention introduces a large amount of spherical fly ash and highly active ultra-fine fly ash into the geopolymer. The spherical material can greatly reduce the viscosity of the geopolymer and facilitate on-site pump injection. As a result, the geopolymer cementing fluid with controllable thickening time provided by the present invention has excellent rheological properties. The reading of the cement slurry in a six-speed rotary viscometer at a speed of 300 r/min is less than 100.

BRIEF DESCRIPTION OF THE DRAWINGS

The contents and advantages described above and/or additional parts of the present invention will become evident from the description of embodiments in conjunction with the following drawings.

DETAILED DESCRIPTION OF THE EMBODIMENTS

Figure 1:
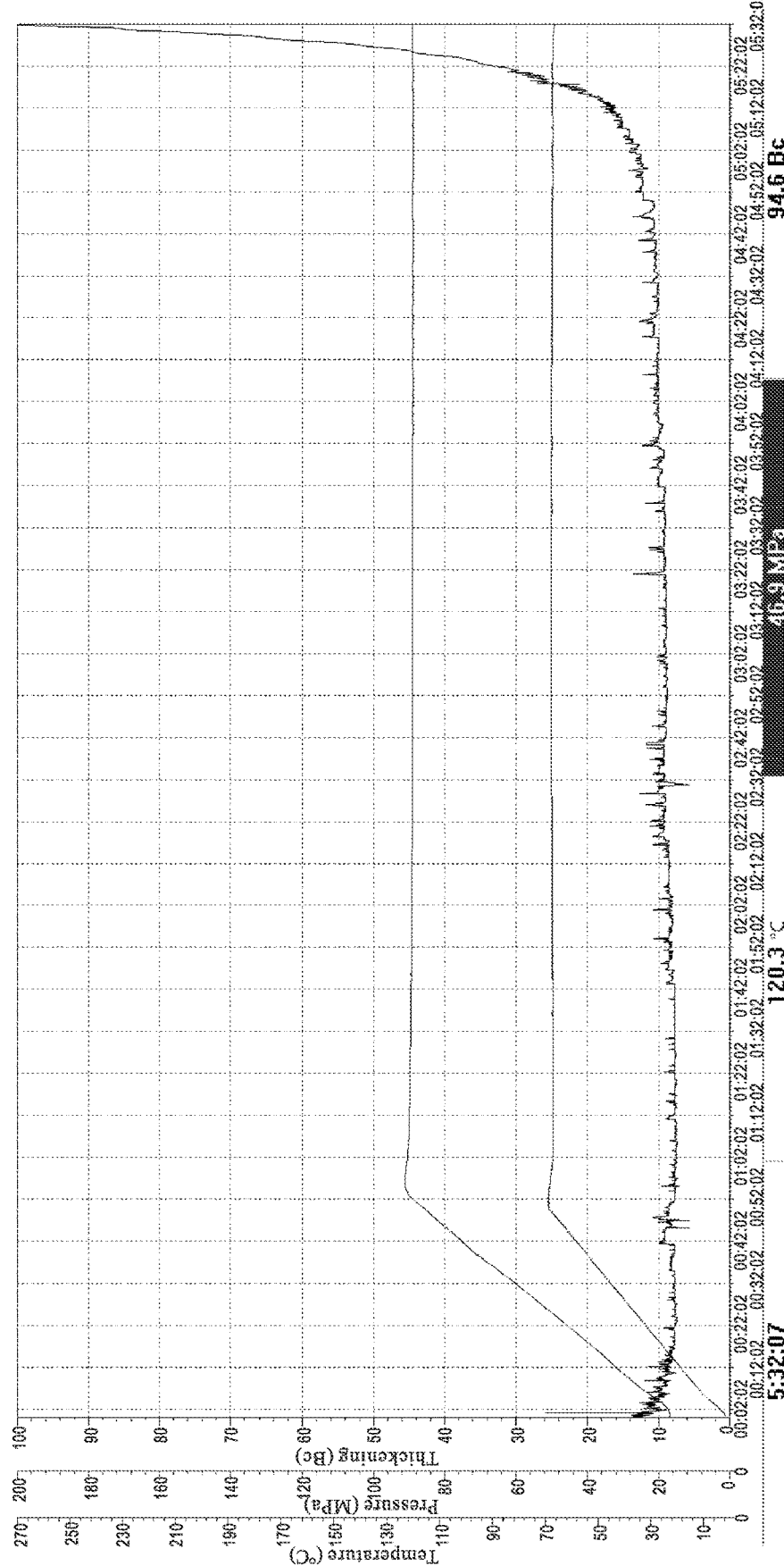
FIG. 1 is a thickening curve of the cement slurry prepared in Embodiment 2 of the present invention (120° C.), where the thickening curve of the cementing fluid shows that the cement slurry is stable and increases from 30 Bc to 100 Bc only needs a thickening time of 12 min, which is beneficial to the prevention of gas channeling and the guarantee of cementing quality.
Figure 2:
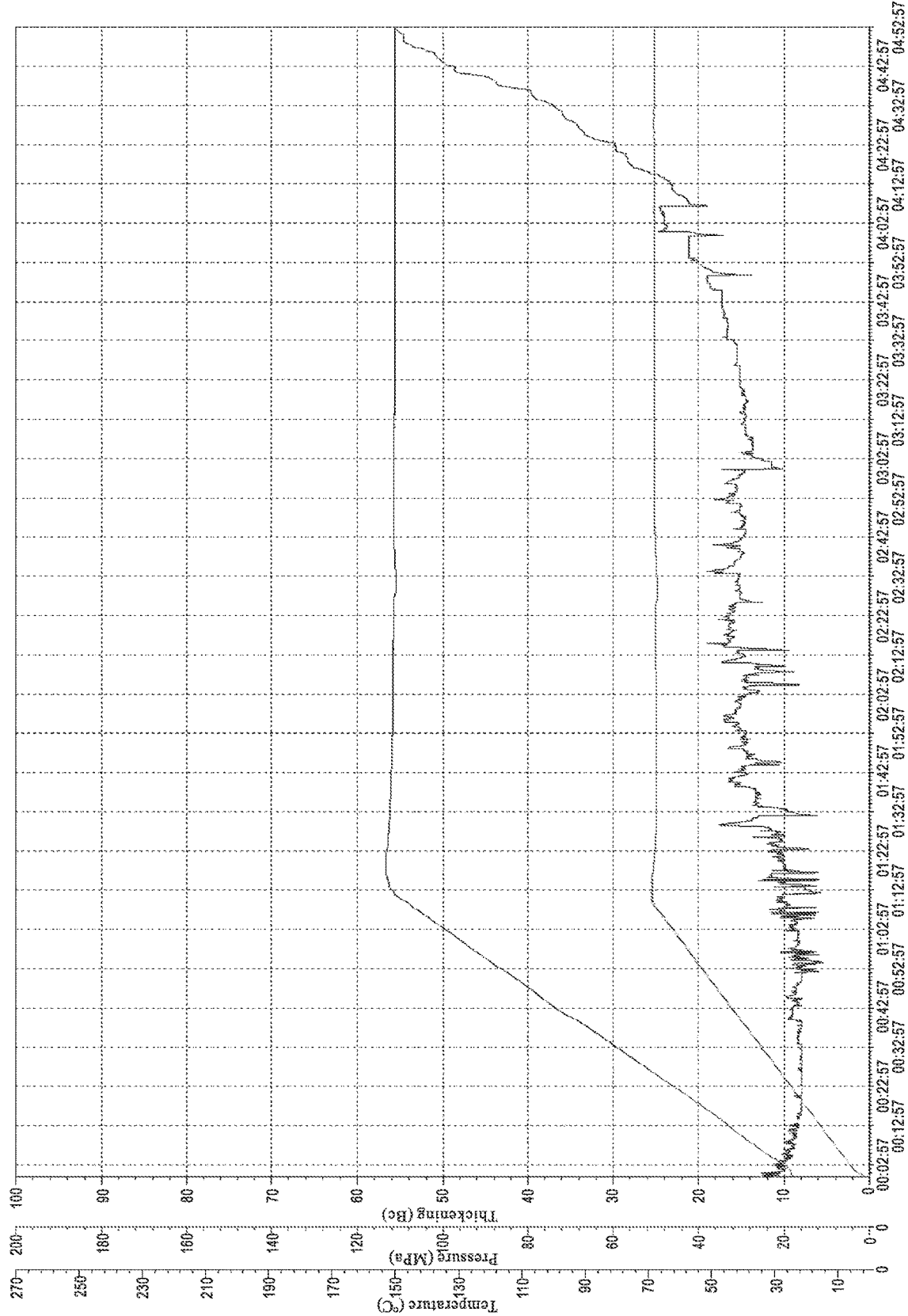
FIG. 2 is a thickening curve of the cement slurry prepared in Embodiment 3 of the present invention (150° C.), where the thickening curve shows that the cement slurry is overall stable, which is beneficial to cementing safety.

To more clearly illustrate the embodiments of the present invention or the technical solutions of the prior art, the embodiments or the prior art will be briefly introduced below. The embodiments described below are only some embodiments of the present invention. For those of ordinary skill in the art, other embodiments can be obtained according to these embodiments without creative work.

Experimental Methods

The cementing fluid was prepared according to the cementing test standard API RP 10B, and the performance and compressive strength of the cementing fluid were determined.

Contrast Example 1

The cementing fluid was prepared with 80 parts of fly ash, 0 part of ultra-fine fly ash, 20 parts of slag, 1 part of anti-settling agent, 35 parts of water, 6 parts of sodium hydroxide, and 2 parts of ethylenediamine tetra(methylene phosphonic acid) sodium. The anti-settling agent is a mixture of diutan gum, diatomite, and fumed silica, and a weight ratio of the diutan gum, the diatomite, and the fumed silica is 1:32:32.

Contrast Example 2

The cementing fluid was prepared with 80 parts of fly ash, 0 part of ultra-fine fly ash, 20 parts of slag, 1 part of anti-settling agent, 35 parts of water, 6 parts of sodium hydroxide, and 4 parts of ethylenediamine tetra(methylene phosphonic acid) sodium. The anti-settling agent is a mixture of diutan gum, diatomite, and fumed silica, and a weight ratio of the diutan gum, the diatomite, and the fumed silica is 1:32:32.

Contrast Example 3

The cementing fluid was prepared with 80 parts of fly ash, 0 part of ultra-fine fly ash, 20 parts of slag, 1 part of anti-settling agent, 35 parts of water, 6 parts of sodium hydroxide, and 6 parts of ethylenediamine tetra(methylene phosphonic acid) sodium. The anti-settling agent is a mixture of diutan gum, diatomite, and fumed silica, and a weight ratio of the diutan gum, the diatomite, and the fumed silica is 1:32:32.

Embodiment 1

The cementing fluid was prepared with 40 parts of fly ash, 40 parts of ultra-fine fly ash, 20 parts of slag, 1 part of the anti-settling agent, 35 parts of water, 3.7 parts of calcium hydroxide, 10.6 parts of sodium sulfate, 4.3 parts of barium hydroxide, and 1 part of ethylenediamine tetra(methylene phosphonic acid) sodium. The anti-settling agent is a mixture of diutan gum, diatomite, and fumed silica, and a weight ratio of the diutan gum, the diatomite, and the fumed silica is 1:32:32.

Embodiment 2

The cementing fluid was prepared with 40 parts of fly ash, 40 parts of ultra-fine fly ash, 20 parts of slag, 1 part of anti-settling agent, 35 parts of water, 3.7 parts of calcium hydroxide, 10.6 parts of sodium sulfate, 4.3 parts of barium hydroxide, and 2 parts of ethylenediamine tetra(methylene phosphonic acid) sodium. The anti-settling agent is a mixture of diutan gum, diatomite, and fumed silica, and a weight ratio of the diutan gum, the diatomite, and the fumed silica is 1:32:32.

Embodiment 3

The cementing fluid was prepared with 40 parts of fly ash, 40 parts of ultra-fine fly ash, 20 parts of slag, 1 part of anti-settling agent, 35 parts of water, 3.7 parts of calcium hydroxide, 10.6 parts of sodium sulfate, 4.3 parts of barium hydroxide, and 3.5 parts of ethylenediamine tetra(methylene phosphonic acid) sodium. The anti-settling agent is a mixture of diutan gum, diatomite, and fumed silica, and a weight ratio of the diutan gum, the diatomite, and the fumed silica is 1:32:32.

Embodiment 4

The cementing fluid was prepared with 30 parts of fly ash, 40 parts of ultra-fine fly ash, 30 parts of slag, 1.5 parts of anti-settling agent, 40 parts of water, 3.7 parts of calcium hydroxide, 8.9 parts of sodium sulfate, 2.1 parts of barium hydroxide, and 3.5 parts of ethylenediamine tetra(methylene phosphonic acid) sodium. The anti-settling agent is a mixture of diutan gum, diatomite, and fumed silica, and a weight ratio of the diutan gum, the diatomite, and the fumed silica is 1:32:32.

Embodiment 5

The cementing fluid was prepared with 40 parts of fly ash, 40 parts of ultra-fine fly ash, 20 parts of slag, 1.5 parts of anti-settling agent, 40 parts of water, 3.7 parts of calcium hydroxide, 8.9 parts of sodium sulfate, 2.1 parts of barium hydroxide, and 3.5 parts of ethylenediamine tetra(methylene phosphonic acid) sodium. The anti-settling agent is a mixture of diutan gum, diatomite, and fumed silica, and a weight ratio of the diutan gum, the diatomite, and the fumed silica is 1:32:32.

Embodiment 6

The cementing fluid was prepared with 40 parts of fly ash, 40 parts of ultra-fine fly ash, 20 parts of slag, 0.7 parts of anti-settling agent, 40 parts of water, 4.0 parts of calcium hydroxide, 8.9 parts of sodium sulfate, 3.0 parts of barium hydroxide, 0.2 parts of sodium tartrate, and 0.2 parts of ethylenediamine tetra(methylene phosphonic acid) sodium. The anti-settling agent is a mixture of diutan gum, diatomite, and fumed silica, and a weight ratio of the diutan gum, the diatomite, and the fumed silica is 1:34:35.

Embodiment 7

The cementing fluid was prepared with 40 parts of fly ash, 40 parts of ultra-fine fly ash, 20 parts of slag, 2 parts of anti-settling agent, 40 parts of water, 4.0 parts of calcium hydroxide, 8.9 parts of sodium sulfate, 3.0 parts of barium hydroxide, 1.5 parts of sodium tartrate, and 3.5 parts of ethylenediamine tetra(methylene phosphonic acid) sodium. The anti-settling agent is a mixture of diutan gum, diatomite, and fumed silica, and a weight ratio of the diutan gum, the diatomite, and the fumed silica is 1:39:40.

TABLE 1

Table of experimental results

| Performance testing | Embodiment | | | | | | | Contrast Example | | |
|---|---|---|---|---|---|---|---|---|---|---|
| | 1 | 2 | 3 | 4 | 5 | 6 | 7 | 1 | 2 | 3 |
| Thickening time at 70° C. (min) | 351 | >500 | >500 | >500 | >500 | 241 | >500 | <10 | <30 | 65 |
| Thickening time at 120° C. (min) | 107 | 332 | 403 | 415 | 443 | 88 | >500 | — | — | — |
| Thickening time at 150° C. (min) | — | 243 | 292 | 301 | 331 | — | >500 | — | — | — |
| Compressive strength at 70° C. (MPa) 24 h | 24 | 6 | 1 | 1 | 1 | 27 | 0 | 5.2 | 5.6 | 5.6 |
| Compressive strength at 70° C. (MPa) 72 h | 41.2 | 42.3 | 40.6 | 36.2 | 34.1 | 41.8 | 26 | 11.3 | 10.9 | 11.4 |

Note:
— represents the geopolymer cementing fluid cannot be tested due to short thickening time.

According to Table 1, the thickening times in Contrast Example 1, Contrast Example 2, and Contrast Example 3 are relatively short, which is less than 65 min at 70° C., indicating that it is difficult to control the thickening time when sodium hydroxide is used as an activator. The thickening time at 120° C. in Embodiment 1 is 107 min, the thickening time at 120° C. in Embodiment 2 is 332 min, and the thickening time at 150° C. in Embodiment 3, Embodiment 4, and Embodiment 5 is 292 min, 301 min, and 331 min, respectively, which shows good time controllability, indicating that the thickening time can be easily regulated by using sodium sulfate and calcium hydroxide (barium hydroxide) instead of sodium hydroxide. In terms of compressive strength, due to the addition of ultra-fine fly ash in the embodiments, the geopolymer has a 72-hour strength much higher than that in the Contrast Examples since the ultra-fine fly ash has high activity. Since retarders are added at a large amount in Embodiment 2, Embodiment 3, Embodiment 4, and Embodiment 5, the thickening (settling) time of the geopolymer is longer, which results in a reduction of the 24-hour strength. Furthermore, the temperature differences of these embodiments are 50° C. and 80° C., respectively, which shows good adaptability to significant temperature differences.

Although embodiments of the present invention have been shown and described, those skilled in the art should understand that these embodiments can be varied, modified, replaced, and transformed without departing from the principle and purpose of the present invention. The scope of the present invention is defined by claims and their equivalents.

What is claimed is:

1. A geopolymer cementing fluid with a controllable thickening time, comprising the following components in parts by weight:
   - a cementitious material: 100 parts,
   - an activator: 5 parts-30 parts,
   - a retarder: 0.2 parts-5 parts,
   - an anti-settling agent: 0.4 parts-4 parts, and
   - water: 30 parts-70 parts;
   wherein
   the cementitious material is a mixture of a fly ash, an ultra-fine fly ash, and a slag;
   the activator is a mixture of sodium sulfate, calcium hydroxide, and barium hydroxide;
   the retarder is a mixture of sodium tartrate and ethylenediamine tetra(methylene phosphonic acid) sodium; and
   the anti-settling agent is a mixture of diutan gum, a diatomite, and fumed silica;
   a weight ratio of the fly ash, the ultra-fine fly ash, and the slag is (20-60):(20-60):(10-30);
   the fly ash has a silica dioxide content greater than 40% and a specific surface area greater than 400 $m^2/kg$;
   the ultra-fine fly ash has a silica dioxide content greater than 40% and a specific surface area greater than 1500 $m^2/kg$;
   a weight ratio of the sodium sulfate, the calcium hydroxide, and the barium hydroxide is (40-80):(5-40):(5-60);
   a weight ratio of the sodium tartrate and the ethylenediamine tetra(methylene phosphonic acid) sodium is ($\geq 0$-$\leq 100$):($\geq 0$-$\leq 100$);
   a weight ratio of the diutan gum, the diatomite, and the fumed silica is (0.1-1):(30-40):(30-40).

2. The geopolymer cementing fluid with the controllable thickening time according to claim 1, wherein the slag is a granulated blast furnace slag with a specific surface area greater than or equal to 400 $m^2/kg$.

3. The geopolymer cementing fluid with the controllable thickening time according to claim 1, wherein the water is freshwater, seawater, or water of different salinities.

* * * * *